US006598009B2

(12) United States Patent
Yang

(10) Patent No.: US 6,598,009 B2
(45) Date of Patent: Jul. 22, 2003

(54) METHOD AND DEVICE FOR OBTAINING ATTITUDE UNDER INTERFERENCE BY A GSP RECEIVER EQUIPPED WITH AN ARRAY ANTENNA

(76) Inventor: Chun Yang, 113 Clover Hill La., Harleysville, PA (US) 19438

( * ) Notice: Subject to any disclaimer, the term of this patent is extended or adjusted under 35 U.S.C. 154(b) by 0 days.

(21) Appl. No.: 09/773,079

(22) Filed: Feb. 1, 2001

(65) Prior Publication Data

US 2002/0169578 A1 Nov. 14, 2002

(51) Int. Cl.$^7$ ............................................. G01C 17/00
(52) U.S. Cl. ........................ 702/152; 702/94; 702/150; 701/200; 701/213; 701/215; 342/357.06; 342/357.11; 342/423
(58) Field of Search ................................ 702/151, 150, 702/152, 107, 94, 95; 342/352, 424, 358, 402, 359, 357.11, 357.15, 357.06, 357.01, 423; 701/200, 207, 213, 214, 215

(56) References Cited

U.S. PATENT DOCUMENTS

| 5,371,506 | A | | 12/1994 | Yu |
| 5,600,326 | A | | 2/1997 | Yu |
| 5,757,677 | A | * | 5/1998 | Lennen ........................ 342/358 |
| 5,978,744 | A | * | 11/1999 | McBride ........................ 33/320 |
| 6,018,315 | A | * | 1/2000 | Ince et al. ................... 244/171 |
| 6,278,404 | B1 | * | 8/2001 | Niles ..................... 342/357.11 |
| 6,407,699 | B1 | * | 6/2002 | Yang ..................... 342/357.12 |

OTHER PUBLICATIONS

Three–Axis Attitude Determination From Vector Observations—by Shuster et al, Journal of Guidance And Control, vol. 4, No. 1.

Rapid Convergence Rate in Adaptive Arrays—by Reed et al, IEEE Transactions On Aerospace And Electronic Systems, vol. AES–10, No. 6, 1974.
Angle Estimation With Adaptive Arrays in External Noise Fields—by Davis et al, IEEE Transactions On Aerospace And Electronic Systems, vol. AES–12, No. 2, 1976.
Monopulse estimation With Adaptive Arrays—by Nickel, IEE Proceedings, vol. 140, No. 5, Oct. 1993.
Synthesis of Adaptive Monopulse Patterns—by Fante, IEEE Transactions On Antennas And Propagation, vol. 47, No. 5, May 1999.
Simultaneous Nulling in the Sum And Difference Patterns Of A Monopulse Antenna—by Haupt, IEEE Transactions On Antennas And Propagation, vol. AP 32, No. 5, May 1984.

(List continued on next page.)

*Primary Examiner*—Bryan Bui
*Assistant Examiner*—Hien Vo
(74) *Attorney, Agent, or Firm*—LaMorte & Associates

(57) ABSTRACT

A GPS receiver that determines its own attitude under jamming conditions is created by augmenting it with an array antenna and a novel signal processing system. The augmented signal processing system comprises a cascaded parallel architecture inserted between the array antenna and the GPS receiver. A blind adaptive nulling processor is cascaded ahead of the GPS receiver so that the GPS receiver can operate on the jamming-suppressed signals in a normal manner. A monopulse angular measurement unit in series with an attitude determination unit interacts in parallel with the blind adaptive nulling processor and the GPS receiver. Constrained beamforming adaptive monopulse is used to simultaneously place nulls in both the sum and difference beams toward jammers while maintaining the monopulse ratio for accurate angular measurement. In this way, the GPS receiver is capable of providing rotational information in addition to regular time and translation information.

16 Claims, 9 Drawing Sheets

OTHER PUBLICATIONS

Adaptive A/D Converter To Suppress CW Interference In DSPN Spread–Spectrum Communications—by Amoroso, IEEE Transactions On Communications, vol. COM–31, No. 10, Oct. 1893.

GPS "Compound Eye" Attitude Sensor—NASA Tech Briefs, May 1999.

Adaptive Arrays With Main Beam Constraints—by Applebaum, IEEE Transactions On Antennas And Propagation, vol. AF 24, No. 5, Sep. 1976.

Simultaneous Nulling in the Sum And Difference Patterns By Amplitude Control—by Vu IEEE Transactions On Antennas And Propagation, vol. AF 34, No. 2, Feb 1986.

* cited by examiner

METHOD AND DEVICE FOR OBTAINING ATTITUDE UNDER INTERFERENCE BY A GSP RECEIVER EQUIPPED WITH AN ARRAY ANTENNA

RELATED APPLICATIONS

This application is related to co-pending U.S. patent application Ser. No. 09/294,221, filed Apr. 19, 1999, entitled, Device and Method for Rapidly Obtaining Direct Acquisition of A Long Code Sequence in A Spread-Spectrum Transmission; and U.S. patent application Ser. No. 09/550,064, filed Apr. 14, 2000, entitled, Method and Device for Rapidly Extracting Time and Frequency Parameters from High Dynamic Direct Sequence Spread Spectrum Radio Signals Under Interference, the disclosures of which are incorporated into this document by reference.

DOCUMENT DISCLOSURE REFERENCE

This application claims priority of Disclosure Document No. 467,710, filed Jan. 18, 2000.

BACKGROUND OF THE INVENTION

1. Field of the Invention

This invention generally relates to radio navigation techniques using Global Positioning System (GPS) signals. More particularly, the present invention relates to the augmentation of conventional GPS receivers with attitude determination capability that can operate in an interference-rich environment by using adaptive nulling and constrained beamforming monopulse techniques.

2. Description of the Prior Art

GPS is one of the most advanced satellite radio navigation systems, maintained by the government of the United States of America. GPS radio navigation relies upon a constellation of twenty-four active satellites in six different orbits around the globe. GPS position fixes are obtained by measuring the propagation delay times of GPS radio signals broadcast by the orbiting GPS satellites. Normally, a user must receive the signals from at least four GPS satellites in order to solve the variables of longitude, latitude, and altitude, as well as timing error that are needed to precisely determine location and time. As its name implies, GPS is a positioning device. In order to see at least four satellites simultaneously on or near the earth, an antenna with a hemispheric reception gain pattern is typically used. See B. W. Parkinson and J. J. Spilker Jr. (eds.), *Global Positioning System: Theory and Applications*, Published by the American Institute of Aeronautics and Astronautics, Inc., 1996 and E. D. Kaplan (ed.), *Understanding GPS: Principles and Applications*, Artech House Publishers, 1996 for a detailed description of GPS and its operations and applications.

GPS phase measurements turn out to be of very good quality, and this has prompted a widespread use of interferometric techniques. More successful use is in surveying applications with double-difference kinematic GPS. GPS interferometric attitude determination has also seen some applications. GPS interferometric attitude determination requires at least three antennas at the tips of two non-parallel baselines separated by several wavelengths. For a given level of phase measurement quality, the attitude estimation accuracy of the technique is proportional to the baseline length. However, continuous outputting of attitude information hinges on reliable resolution of phase integer ambiguity and repair of cycle slips after their detection. Both techniques are computationally very demanding in real time.

Furthermore, most interferometric configurations for GPS attitude determination do not include any provision against the presence of interference such as jamming and/or multipath.

Recently, array antennas have been introduced mostly in military applications for jam-suppression and signal to noise ratio (SNR) enhancement. It is therefore an object of this invention to utilize array antennas for GPS attitude determination in addition to conventional positioning and timing with an improved capability of operating under interference.

However, a straightforward combination of GPS interferometry and multiple antenna arrays for attitude determination, assuming it would work, is not cost-effective. Each antenna array with an anti-jam spatial filter may serve as a jam-free antenna. However, the spatial filters associated with these antenna arrays have to affect the signal in a very similar manner in order to preserve the gain and phase relationships. This is too costly and cumbersome. More critically, anti-jamming manipulation of GPS signals would introduce adverse effects on kinematic carrier phase attitude determination that are difficult to constrain or minimize. That is, the very same carrier phase measurements needed for attitude estimation have been adjusted in gain and/or phase by an anti-jam spatial filter in antenna electronics to attenuate jammers. Even if a jamming signal is totally suppressed from the output of an anti-jam spatial filter that inputs from an antenna array, the jamming signal still corrupts individual array antenna elements. As a result, the spatially filtered antenna array signal, as a whole, can be used for positioning but not for attitude determination. This is because of unpredictable phase distortion. Similarly, individual antenna elements cannot be used for attitude determination, as in a conventionally interferometric manner, because these antenna elements still contain jamming signals. It is therefore an object of this invention to seek other rather interferometric techniques for GPS attitude determination under interference.

Quinn and Crassidis (see D. A. Quinn and J. C. Crassidis, "GPS 'Compound Eye' Attitude Sensor," *NASA Tech Briefs*, May 1999) outlines an approach, different from interferometry, to attitude determination using GPS signals. In their design, multiple directional antennas are mounted on a convex hemispherical surface with polyhedral arrangement. Each antenna is thus aimed to receive GPS signals from a certain field of view, called a visualization cone. Their idea is to use the special GPS antennas arranged in a "compound eye" as star trackers and the GPS satellites as well-known, well-behaved stars. As GPS satellites pass through the various fields of view, attitude can be determined in a manner identical to what has been employed by standard star trackers for many years. Compared to interferometric GPS, the "compound eye" is easy to get a first fix to attitude and its accuracy is not limited by structure size. Because it does not require carrier phase or Doppler shift estimation, it is much less sensitive to Doppler and multipath effects as well as line biases. The antenna geometry provides maximum sky coverage without the need for self-survey calibrations. However, the attitude estimation accuracy of the "compound eye" depends upon the number of antennas and, more critically, upon the precision at which individual antenna patterns can be physically shaped, oriented, and mounted. The latter is imaginably associated with substantial cost of manufacturing and installation particularly when it is small.

Alternative to the interferometric GPS and different from the special antenna system of a "compound eye" attitude sensor, the present invention solves the directions of arrival of GPS incident signals for attitude determination using GPS monopulse. Monopulse is a mature technique widely used in surveillance and tracking radar. See, for example, D. K. Barton, *Modern Radar Systems Analysis*, Artech House, 1988, M. Sherman, *Monopulse Principles and Techniques*, Artech House, 1988, and I. Leanov and K. I. Fomichev, *Monopulse Radar*, Artech House, 1986. In simple terms, monopulse angular measurement is based upon distinct angular responses of directional antennas (i.e., with finite beamwidth) to signals incident from different directions. For each angular dimension (azimuth or elevation), two squint antenna patterns are formed with an angular displacement typical half of the beamwidth, from which a pair of sum and difference beams are generated. The ratio of the sum over difference beam responses provides the measurement of an angular offset of the incident wavefront off the array boresight. The squint beams can be generated either physically with directional antennas or with omnidirectional antenna arrays electronically or digitally in a digital beamforming process.

In general, angular accuracy, in terms of estimation error, is inversely proportional to aperture size. For an array antenna with a small number of elements, the GPS monopulse technique may provide an angular solution less accurate than that of the GPS interferometry technique. However, the latter can only do so if good phase measurements are available as previously analyzed. Besides, it may suffer from the problem of carrier cycle integer ambiguity, further complicated by cycle slip. Its solution cannot be made available until code and carrier tracking have been achieved and maintained in the receiver. In comparison, the GPS monopulse technique is faster, more robust, and less vulnerable than the interferometric counterpart. In one application, the GPS monopulse technique may be used to provide a quick "coarse" attitude solution to initialize a slow "finer" interferometric attitude solution and to back it up when the interferometric solution becomes unavailable due to cycle slips or other outages.

Compared to omnidirectional or hemispheric antennas used in conventional GPS receivers, array antennas provide the directionality by spatial filtering, with which antenna patterns or beams can be electronically and/or digitally synthesized and steered in adaptation to the changing environment. One example is to maximize the reception in the direction of desired signals, while minimizing the reception in the direction of unwanted signals. Since most interference sources are unknown, a priori and may be moving, their angular locations have to be learned from data adaptively. To use monopulse under interference, nulls toward interference have to be placed simultaneously in both the sum and difference beams in the same directions. Further, the nulling in the sum and difference beams has to be constrained so that it will not distort the monopulse ratio slope in order to maintain the accuracy of angular measurement. These requirements have naturally lead to a constrained beamforming adaptive monopulse.

Most constrained beamforming, adaptive nulling, and digital monopulse techniques have originated from and thus been developed for radar applications. The radar signal characteristics, system architecture, operating mode, application environment, and information to extract are quite different from those in GPS applications of interest to the present invention. It is therefore an object of this invention to adapt and improve on constrained beamforming adaptive monopulse techniques for GPS attitude determination.

A conventional GPS receiver is capable of providing the position and time information. When augmented with the attitude sensing capability of the present invention, it will provide the time, translation (position and velocity), and rotation (attitude and angular rates) seven degrees of freedom (7DOF) information. It becomes fully capable of navigation. However, the navigation capability offered by the present invention differs from an inertial navigation system (INS) made up of accelerometers and gyroscopes (see, K. R. Britting, *Inertial Navigation Systems Analysis*, Wiley-Interscience, 1971) in four aspects. First, the GPS navigation system according to the present invention can provide a very accurate time information that an INS cannot. Second, most inertial sensors such as gyros and accelerometers are "interval" sensors in that they measure incremental changes in angle and velocity, respectively. These measurements have to be integrated over time once and twice, respectively, to produce attitude and position. By consequence, how to initialize the inertial integration becomes a critical problem. The GPS navigation system of the present invention is a "point" sensor in that it directly measures the position and attitude. Third, due to accumulation by integration, the inertial navigation solution experiences an unbounded error growth, while the GPS solution exhibits a uniform error around the global and over time. Fourth, both INS and GPS are passive system but the former is self-contained in that it does not need any external information except for initialization. This is advantageous and sometimes necessary for some applications. As a result, the two systems may be used in a complementary manner. Being a point sensor also suggests an interesting mode of operation in which the GPS navigation system of the present invention intermittently operates on incident signals of short segment just enough for a point solution. The present invention thus has the potential to meet the navigational needs of special cases where continuous operation is impossible due to signal blockage or the sensor is exposed to the GPS signals only for a short period of time. Intermittent operation may just be desired to conserve energy or inexpensive processors used in the sensor can only handle the computational throughput for a snapshot solution.

Ince and Smith (see M. D. Ince and R. H. Smith, Method and System for Attitude Sensing Using Monopulse GPS Processing, U.S. Pat. No. 6,018,315, Jan. 25, 2000) disclose a GPS attitude sensor design having the potential to replace magnetometers, sun sensors, and/or horizon sensors for spacecraft attitude control. But their invention is distinguished from the present invention in five aspects. First, Ince's and Smith's invention is basically an analog design with radio frequency (RF) sum and difference circuitry. The present invention presents a digital design with the sum and difference beams formed in the baseband. Second, they utilize a pair of antennas with fixed patterns toward one satellite and in order to steer the beams for alignment, the entire platform has to be physically rotated. The present invention employs an array antenna that can digitally form beams and steer them toward any GPS satellite visible. Third, due to the beamwidth conflicts (i.e., narrow beams for monopulse angular measurement and omnidirectional for regular GPS receiver), two types of antennas have be configured in their design, while an array antenna is the only one used in the present invention. Fourth, Ince and Smith do not incorporate any interference suppression capability or ability to maintain monopulse accuracy under interference in their design. Fifth, the monopulse processor in their invention supplies an angular offset estimate to the attitude control unit for a single-axis attitude adjustment (e.g., tilt correction), rather than providing the full three-axis attitude solution (e.g., roll, pitch, and yaw) relative to a pre-defined coordinate system for the navigation purpose as in the present invention.

A need therefore exits for an augmentation of conventional GPS receivers with attitude determination capability that can operate in an interference-rich environment and that can service attitude control, navigation, and interference-locating purposes among others. This need is met by the present invention as described and claimed below.

SUMMARY OF THE INVENTION

The present invention is a signal processing method and system that can make a regular GPS receiver equipped with an array antenna capable of determining its own attitude in addition to regular timing and positioning under jamming conditions. The augmented signal processing system comprises a cascaded parallel architecture inserted between the array antenna and the regular GPS receiver. A blind adaptive nulling processor is cascaded ahead of the regular GPS receiver so that the GPS receiver can operate on the jamming-suppressed signals in a normal manner. A monopulse angular measurement unit in series with an attitude determination unit interacts in parallel with the blind adaptive nulling processor and the regular GPS receiver. Constrained beamforming adaptive monopulse is used to simultaneously place nulls in both the sum and difference beams toward jammers while maintaining the monopulse ratio for accurate angular measurement. A regular GPS receiver is modified so as to provide information necessary for monopulse angular measurement and integrated attitude determination. In this way, the augmented GPS receiver is capable of providing rotational information (three-axis attitude and angular rates) in addition to regular time and translation (position and velocity) information, hence a 7DOF receiver. The augmented GPS receiver can also be used as a self-contained device to locate the sources of interference among other applications.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention system and method can be used with other satellite navigation systems, communication systems and spread-spectrum signals, the present invention system and method are particularly well suited for use with GPS signals. Accordingly, an exemplary embodiment of the present invention will be described in an application of attitude determination with GPS signals under interference.

Figure 1:
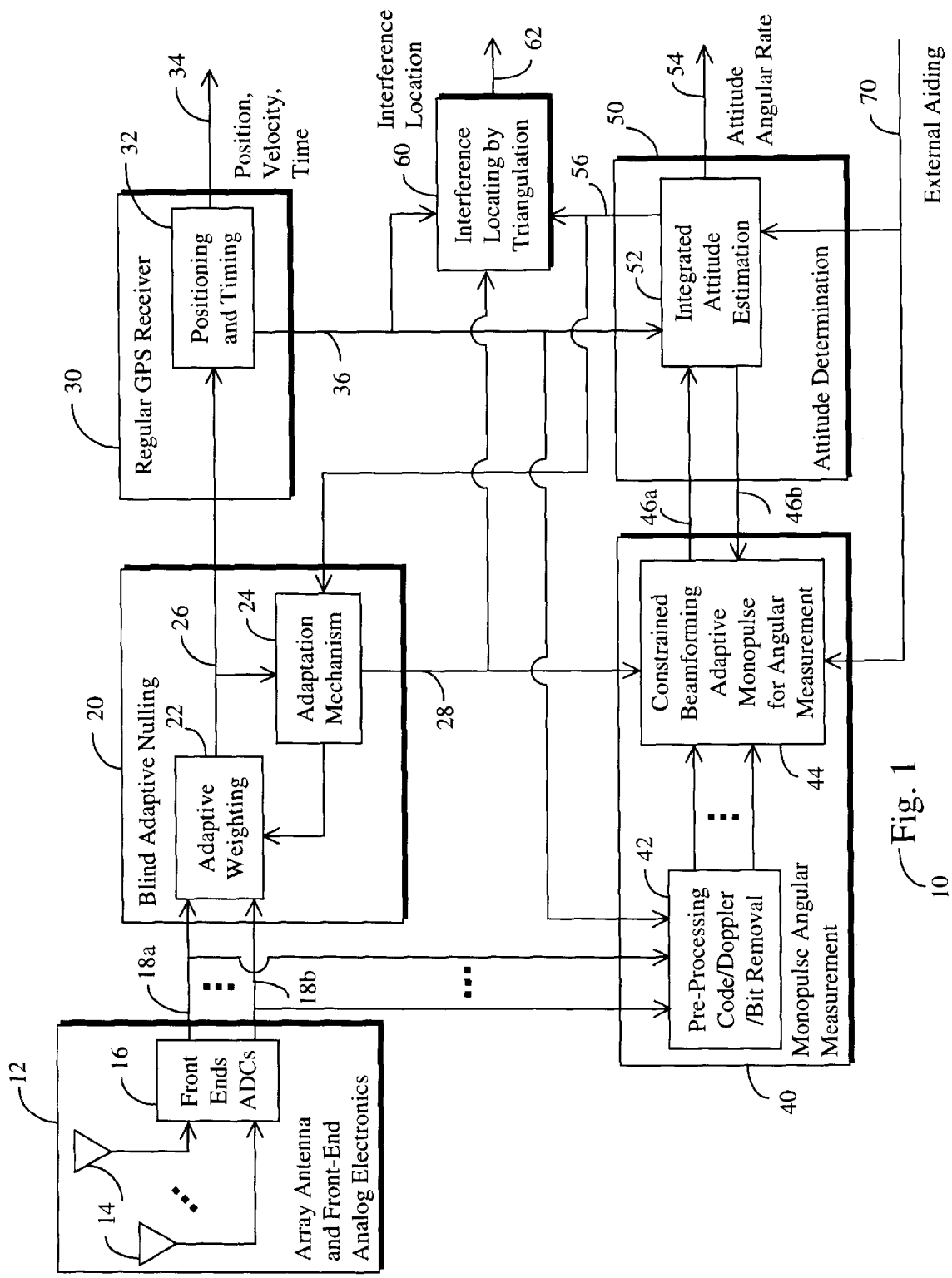
FIG. 1 is a schematic illustrating an exemplary embodiment of the overall architecture of the present invention system and method.

Referring to FIG. 1, an exemplary schematic of an array antenna-augmented GPS receiver having seven degrees of freedom (7DOF) and interference-suppression capabilities is 10 shown in accordance with the present invention. A modified GPS receiver 30 with a positioning and timing unit 32 is equipped, in accordance with the present invention, with an array antenna 12 and its electronics, in place of a regular single omnidirectional antenna as otherwise is used in conventional GPS receivers. GPS signals transmitted by various GPS satellites are captured by array antenna elements 14. The received GPS signals are analog and are processed by the front-end analog electronics 16. The signals are then sampled and quantized for subsequent digital processing. Further descriptions are later described with reference to FIG. 2 and FIG. 5.

Connected via digital signals 18 to the array antenna electronics 12 is a blind adaptive nulling processor 20, cascaded ahead of the GPS receiver 30. By an adaptation mechanism 24, the digital signal paths from individual antenna elements are combined by a set of adaptive weighting 22. Any information about the signals of interest and/or interference passed over via 56 is used in the adaptation process. This results in a single combined signal 26, from which the unwanted interference components are removed or suppressed, while the desired GPS signals are preserved or enhanced. Further description is provided in FIG. 3 and FIG. 4.

The combined signal 26 is worked upon by a regular GPS receiver 30 to provide the position, velocity, and time information 34 to a user as if the interference had never been present.

Also connected via digital signals 18 to the array antenna electronics 12 is a monopulse angular measurement process 40 and an attitude determination process 50, operating in parallel with the blind adaptive nulling processor 20 and the GPS receiver 30. The individual antenna element signals 18a and 18b are first passed through a preprocessing unit 42 to remove code chip, Doppler frequency, and data bit with the reference information provided through 36 by the regular GPS receiver that is modified for the purpose. The preprocessed signals are then used by the constrained beamforming adaptive monopulse processor 44 to obtain a measurement of the angle of arrival of the incident wavefront, with the information about interference via 28 from the blind adaptive nulling processor 20, in accordance with the present invention. Further description is provided in FIG. 6 and FIG. 7.

With the measured angles of arrival of GPS signals 46a and the corresponding GPS satellite positions as well as the receiver ownship position through 36, the attitude determination processor 56 can then derive an integrated three-axis attitude estimate with respect to a pre-defined reference frame. Further description is provided in FIG. 8 and FIG. 9.

Any external aiding information from such sources as an inertial navigation system and a radio data link 70 can be fully used in the monopulse angular measurement 40 and attitude determination 50 in accordance with the present invention.

In addition to providing the 7DOF information, i.e., the regular GPS time and translation (position and velocity) 34 and the rotation (attitude and angular rate) 54, the present invention also offers a self-contained capability of locating the interference sources 62. Angular directions of interference relative to the array antenna can be obtained as a by-product in the blind adaptive nulling processor 20 and made known via 28. The angular directions can then be converted to a common reference frame once the antenna attitude is supplied via 56. When the angles to interference sources are measured at several distinct points known via 36, the interference source locations can then be determined within the common reference frame by a simple triangulation process in accordance with the present invention.

Figure 2:
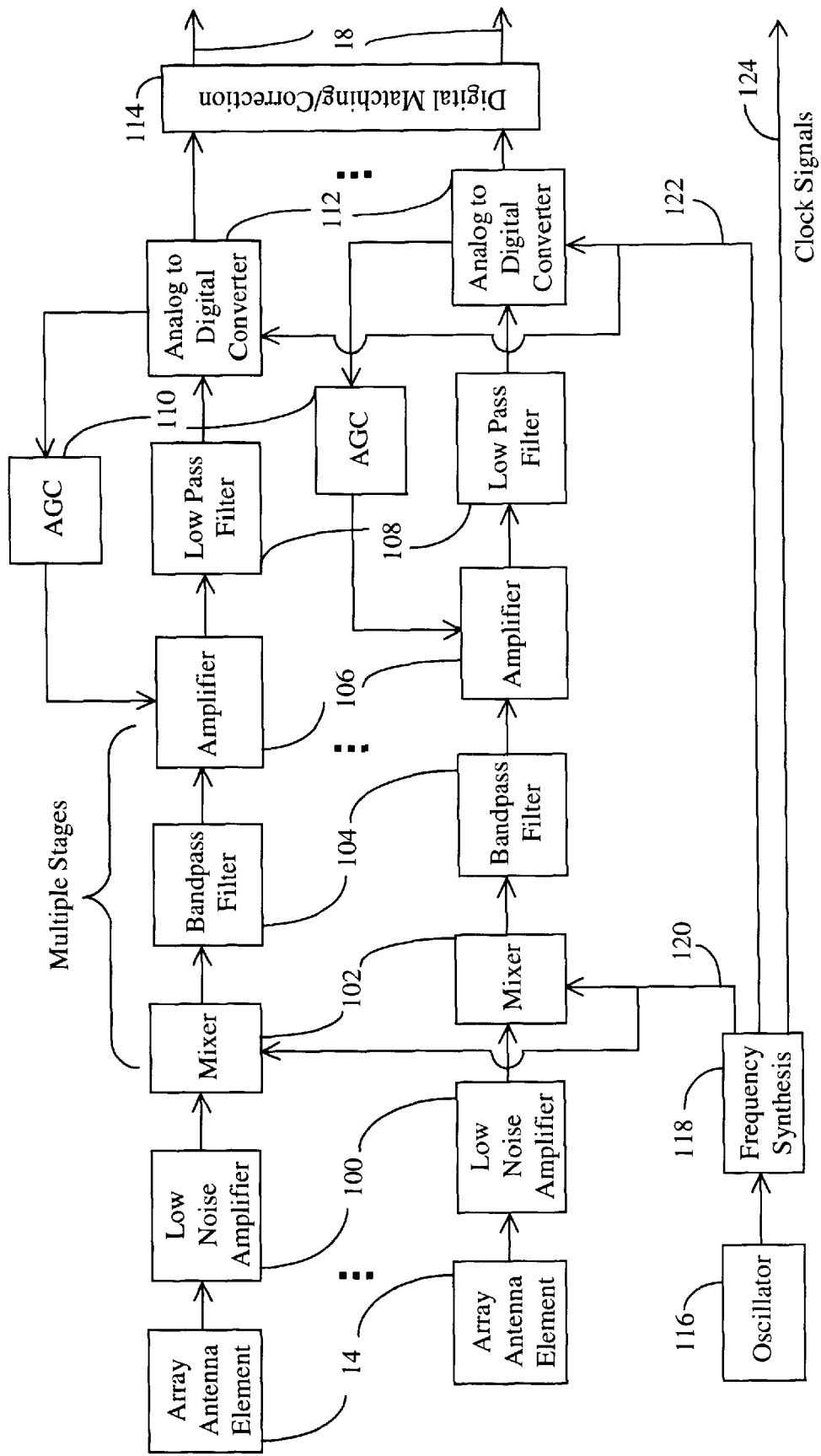
FIG. 2 is a schematic of an exemplary embodiment of an array antenna and its front-end analog electronics in accordance with the present invention.

Referring to FIG. 2, each GPS array antenna element 14 is followed by a GPS front-end analog electronics that comprises a low noise amplifier 100, mixers 102, bandpass filters 104, amplifiers 106, a low pass filter 108, an automatic gain control (AGC) 110, and an analog to digital converter (ADC) 112. The set of a mixer, a bandpass filter, and an amplifier with an appropriate reference frequency is called a down-conversion stage. Multiple stages may be used to ease the design and construction of the analog front-ends. Array antenna elements 14 capture GPS signals that are transmitted by various GPS satellites. The GPS signals received by various array antenna elements 14 are analog. The antenna elements are coupled to radio frequency (RF) front-ends. The received analog signals are filtered in the front-end analog electronics, which convert the GPS signal from an L1 carrier at 1575.42 MHz or an L2 carrier at 1227.6 MHZ down to an intermediate frequency (IF) at several MHz suitable for digitization. The IF signals are then sampled and quantized in ADCs 112 and passed over for subsequent digital processing. The AGC circuit 110 is used to ensure a proper dynamic range at the ADC 112. It can also be used to counter continuous wave (CW) jamming adaptively. See F. Amoroso, "Adaptive A/D Converter to Suppress CW Interference in Spread Spectrum Communications," *IEEE Trans. on Communications*, Vol. 31, No. 10, October 1983, the disclosure of which is incorporated into this specification by reference.

Driven by an oscillator 116, a frequency synthesizer 118 provides the common frequency source to all analog front-ends for frequency down-conversion and analog to digital conversion. It may also provide clock signals 124 to subsequent digital signal processors (DSPs) and application-specific integrated circuits (ASICs). Different from conventional GPS receivers where only a single antenna and a single analog front-end are required, the present invention makes use of an array of antennas and an equal number of analog front-ends. Array antennas could be linear, circular, planar, or conformal of any type or construction as determined by applications. However, the matching conditions between the antenna elements and analog electronics are important. Although not shown in FIG. 2, it is possible to include a test pilot signal injected at antenna elements so that all analog front-ends can be calibrated and their discrepancy compensated for. Tests of the entire array antenna and analog electronics can also be done off-line in an anechoic chamber and the resulting calibration coefficients can then be applied in a digital matching and correction unit 114 before the digital signals 18 are sent off for subsequent processing. The techniques for the design and constructions of antennas and front-ends that possess the characteristics relevant to the present invention are well known to those of ordinary skill in the art.

Figure 3:
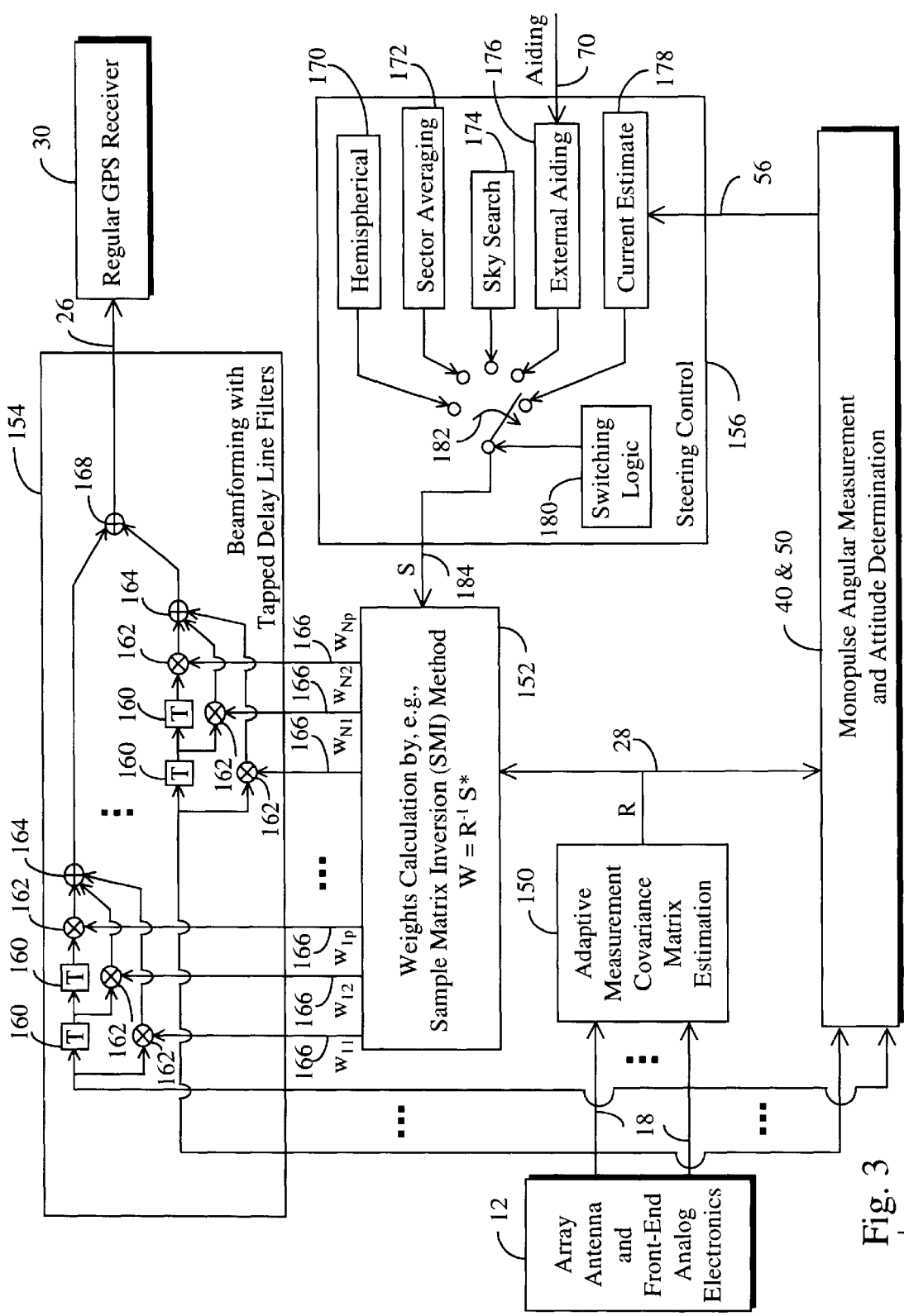
FIG. 3 is a schematic of an exemplary embodiment of a blind adaptive nulling process in accordance with the present invention.

Referring to FIG. 3, an exemplary schematic of a blind adaptive nulling processor 20 is shown in accordance with the present invention. Many prior-art adaptive processing techniques, previously developed for radar, sonar, and seismic array signals can be adapted to GPS interference suppression within the framework of the present invention. Such prior art techniques are exemplified by R. A. Monzingo and T. W. Miller, *Introduction to Adaptive Arrays*, John Wiley & Sons, 1980; S. Hatkin and A. Steinhardt (eds.), *Adaptive Radar Detection and Estimation*, John Wiley & Sons, Inc., 1992). This is illustrated with an exemplary use of the Sample Matrix Inversion (SMI) method by L. S. Reed, J. D. Mallett, and L. E. Brennan, "Rapid Convergence Rate in Adaptive Arrays," *IEEE Trans. on Aerospace and Electronic Systems*, Vol. 10, No. 6, November 1974. According to the method, the optimal weighting vector 166 $W=[w_{11}, w_{12}, \ldots, w_{1p}, \ldots, w_{N1}, w_{N2}, \ldots, w_{Np}]^T$ for an array of N antenna elements, each having p delays 160, is computed in the weights calculator 184 by:

$$W = \alpha R^{-1} S^* \quad (1)$$

where R is the covariance matrix of array antenna measurements, S is the direction vector at which the maximum reception pattern is desired, $\alpha$ is a scaling factor, and the superscript $-1$ and $*$ stand for vector transpose matrix inversion and complex conjugate, respectively.

The interference wavefront impinges on the array antenna with a phase delay consistent across the array elements. The measurements taken at individual elements are thus correlated with a well-defined angular information about the interference. For independent jammers, each interference source contributes to the covariance matrix as a dyad. The overall covariance matrix R 28 is learned from data by the adaptive measurement covariance matrix estimator 150. This covariance matrix should only contain those from interference and thermal noise but not from the desired signals in order to avoid signal cancellation. The estimation of such a covariance matrix has no problem for active radar because it can select returns by time gating. However, the GPS signals are omnipresent to omnidirectional antennas. Fortunately, the GPS signals are very weak even compared to thermal noise and their presence may just be ignored in the covariance matrix estimation process. Or, they may be excluded from the computation by some prior-art blocking techniques. Such techniques are disclosed in S. P. Applebaum and D. J. Chapman, "Adaptive Arrays with Main Beam Constraints," *IEEE Trans. on Antennas and Propagation*, Vol. 24, No. 5, September 1976. The number of measurement samples required for reliable covariance matrix estimation is about twice the number of total weights (2Np). Either the covariance matrix R or its inverse $R^{-1}$ can be estimated, with some numerical stable algorithms such as recursive singular value decomposition (SVD) (see J. R. Bunch and C. P. Nielsen, "Updating the Singular Value Decomposition," *Numer. Mathematik*, Vol. 31, No.2, 1979).

Figure 4A:
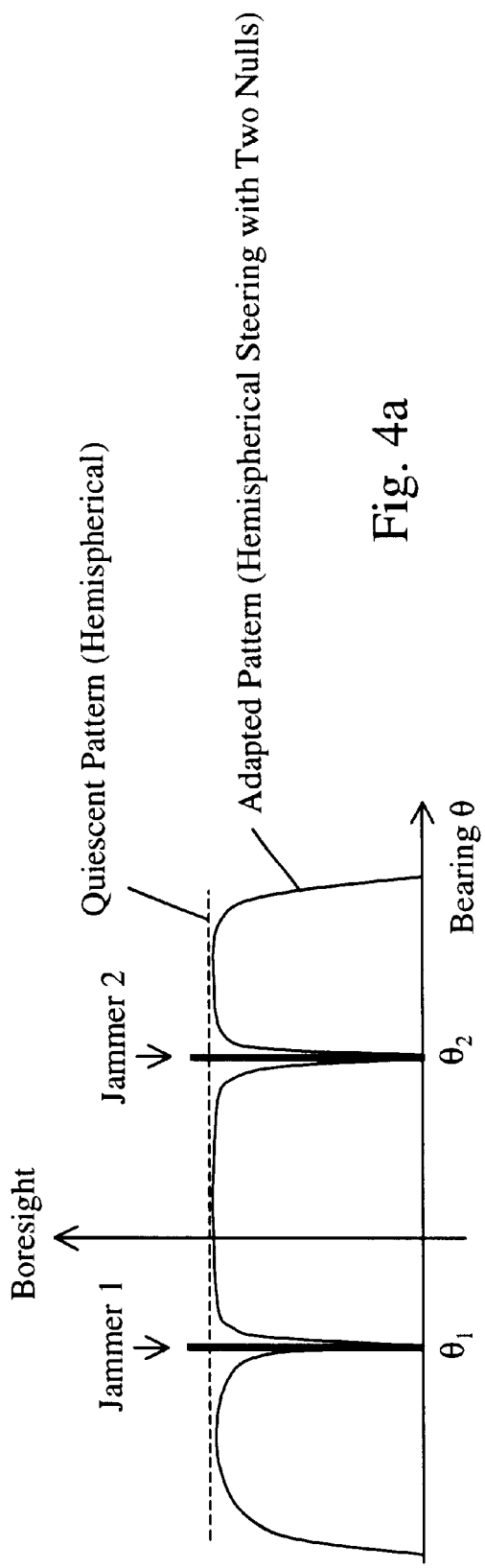
FIG. 4a and FIG. 4b show typical quiescent and adapted antenna patterns respectively in the omnidirectional and steered modes of the exemplary blind adaptive nulling process in accordance with the present invention.
Figure 4B:
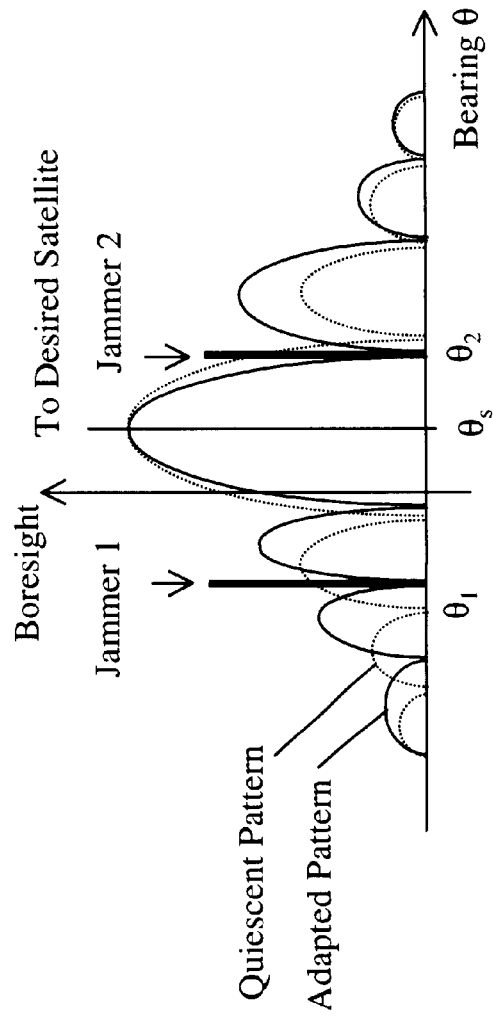

Tapped delay line (TDL) filters 154 are used to implement beamforming in the time domain that place nulls toward interference sources in the antenna pattern. Each antenna output is passed through p delays 160, the signal at each delay is weighted at a multiplier 162, and the successively delayed and weighted signals for each antenna element are summed at an adder 164. The summed signals from all antenna elements are summed again at an adder 168 and the resulting signal is sent over to the regular GPS receiver via 26. Without the tapped delay line filters, the weighted sum of array antenna outputs constitutes a spatial filtering which is effective against narrowband directional jammers only. With the tapped delay line filters, however, the weighted sum of delayed array antenna outputs constitutes a temporal and spatial filtering which is effective against both narrowband and wideband jammers. The steering vector S 184 used in the adaptive weights calculation 152 is provided by the steering control unit 156. A switching logic 180 is designed to selectively connect the steering vector 184 to an appropriate generator via the switch 182 in accordance with the present invention. When used as weights, a steering vector can also be understood as the quiescent pattern that is to be preserved or as a desired pattern to be attained in the presence of interference. In the acquisition mode, since no a priori information about the GPS satellite visibility is available, the use of a hemispheric antenna pattern 172 is reasonable. A hemispheric antenna pattern is what a regular GPS receiver utilizes as graphically shown by the dashed line of FIG. 4a. The solid line in FIG. 4a represents a typical antenna pattern adapted by the beamforming 154 that places, for example, two nulls at $\theta_1$ and $\theta_2$ toward jammer 1 and jammer 2, respectively. In this mode of operation, a single set of hemispherical weights can be used by all channels, each assigned to a different GPS satellite visible, in the GPS receiver. An averaged steering vector over the entire hemisphere or a smaller angular sector 172 can also be used. Once a GPS satellite is detected, its angular acquisition can be initiated from a cold start by a sky search process 174. When the attitude estimate 178 is available, a directional antenna pattern can be synthesized that is steered toward a desired GPS satellite to enhance its reception. FIG. 4b graphically shows the quiescent directional pattern as the dashed line. The solid line is the adapted pattern that has been modified from the quiescent dashed line to produce two nulls at $\theta_1$ and $\theta_2$ toward jammer 1 and jammer 2, respectively. In this mode of operation, each adaptive weighting produces a highly shaped antenna pattern toward a particular desired satellite and no other satellites can use it. By consequence, a distinct beam has to be formed for each and every satellite under tracking. In either angular acquisition or tracking mode, external information 70 if available can be incorporated into the steering vector 176 to facilitate the operation.

Figure 5:
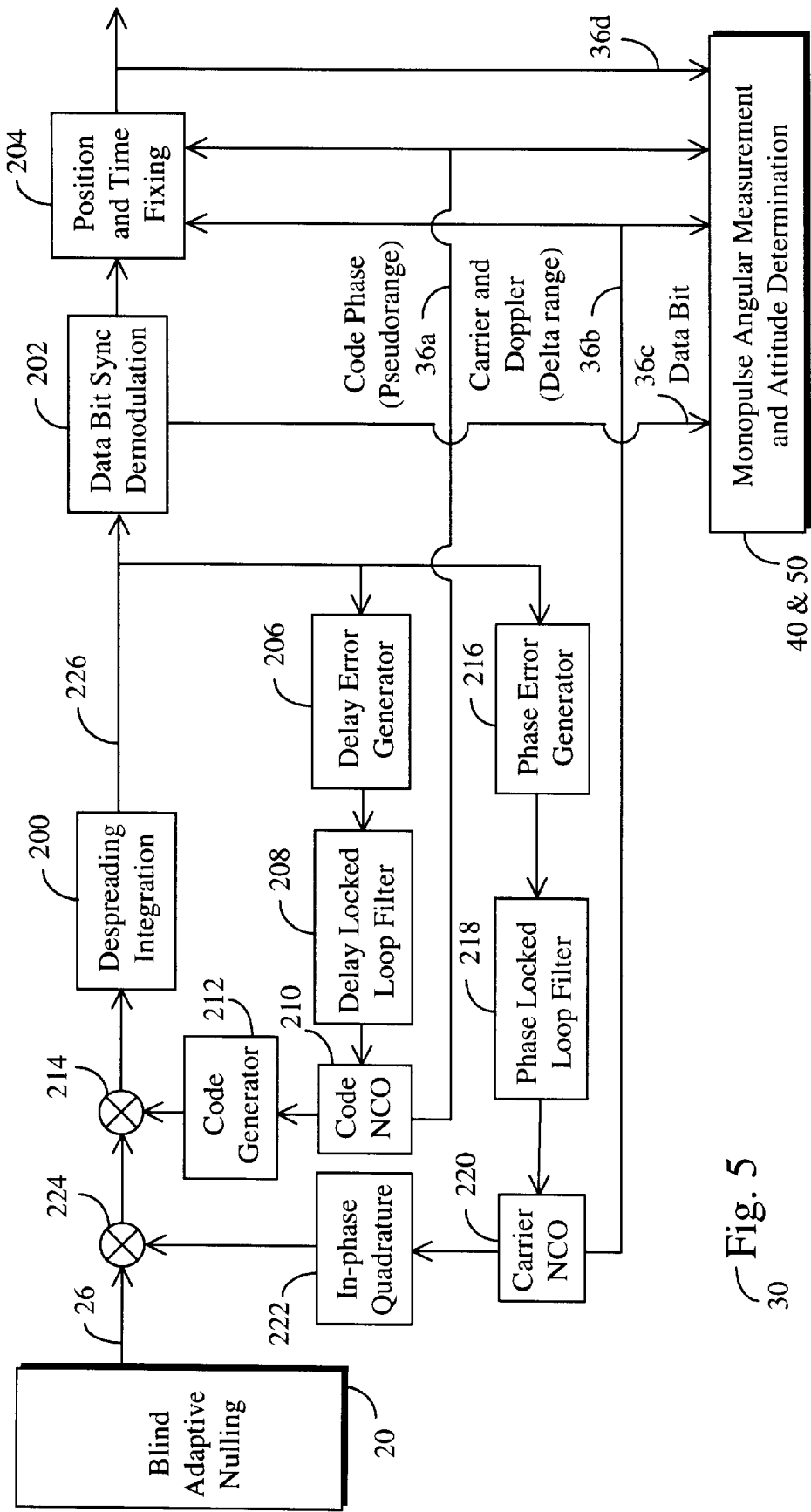
FIG. 5 is a schematic of an exemplary embodiment of modifications made to a regular time-domain GPS receiver in accordance with the present invention.

Referring to FIG. 5, a typical schematic of a regular GPS receiver is shown in which exemplary modifications are introduced for use by the present invention. A conventional GPS receiver typically has twelve tracking channels in parallel, each assigned to a different satellite. The incoming signal at MHz level 26 is mixed at a mixer 224 with the in-phase and quadrature components 222 of the locally generated carrier 220 to remove Doppler frequency. The incoming code sequence is then stripped off from the Doppler-removed baseband signal at a multiplier 214 by the locally generated code replica usually in the forms of early, punctual, and late sequences from the code generator 212. The resulting products are summed up in accumulate and dump circuits or correlators, also known as despreading integration 200. The integrated signals 226 are then used for navigation data bit sync and demodulation 202 that provides the ephemeris of the satellite under tracking and its clock correction coefficients. The same integrated signals 226 are used by the delay-locked loop (DLL) to generate the delay errors 206, which, after filtering 208, drive the code numerical controlled oscillator (NCO) 210 to reduce the measured delay errors. From the same integrated signals 226, the phase errors 216 are generated in the phase locked loop (PLL) that, after filtering 218, drive the carrier NCO to reduce frequency or phase errors. In modern GPS receivers, the tracking channels are closed in software and operate at kHz level. The code and carrier NCOs provide code phase (pseudo range) 36a and carrier phase and Doppler (delta range) 36b to a navigation processor for position and time fixing 204, operating at several Hz level. Code phase 36a, carrier phase 36b, and data bit 36c are made available at appropriate rates to the monopulse angular measurement 40 in accordance with the present invention. The satellite position and user position 36d are similarly sent to the attitude determination 50 in accordance with the present invention.

Figure 6:
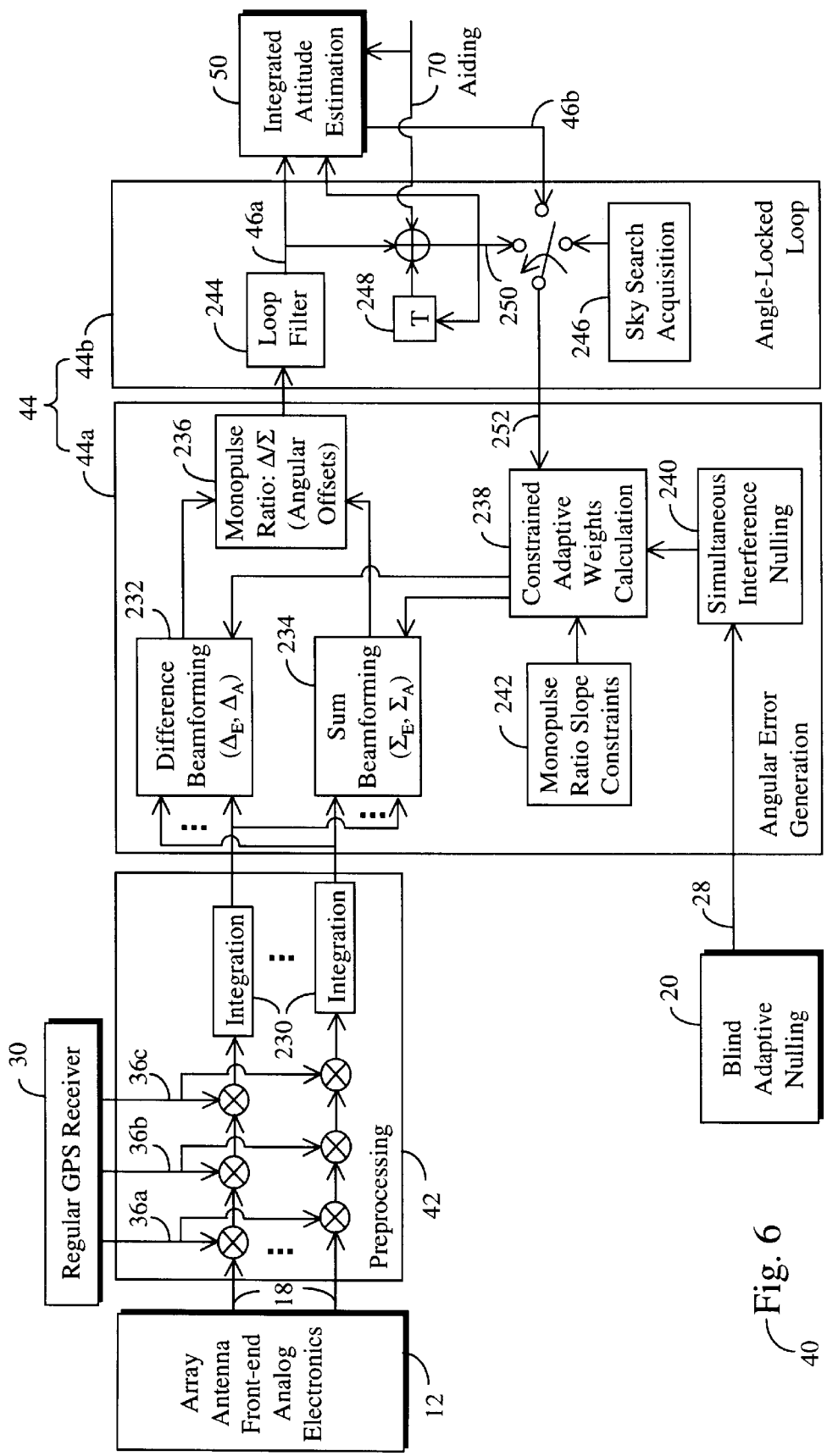
FIG. 6 is a schematic of an exemplary embodiment of a monopulse angular measurement process in accordance with the present invention.

Referring to FIG. 6, an exemplary embodiment of monopulse angular measurement 44 is shown in accordance with the present invention. The incoming GPS signal samples 18 are first pre-processed in the block 42. With the information 36 provided by the modified regular GPS receiver 30, the residual Doppler frequency 36a, code chip 36b, and data bit 36c are removed and the resulting incoming samples are cumulated by integration 230. The removal of navigation data bit 36c may become unnecessary in consideration of the subsequent ratio operation 236 if the interval of integration 230 is synchronized with the data bit rate. The integration 230 of the Doppler-removed codestripped samples effectively reduces the data rate at the output, making it more convenient for subsequent monopulse calculation. With a much narrower bandwidth after despreading, the signal to noise ratio (SNR) is restored by the high processing gain to ensure angular measurement accuracy. The despreading of GPS signals means the simultaneous spreading of interference signals that appear in an additive manner in the incoming samples. Although the temporal and spectral characteristics of interference are altered, the spatial characteristics and their cross-correlations across the array antenna elements remain intact. This guaranties the angular authenticity of the post-correlation monopulse exemplified in FIG. 6. The constrained beamforming adaptive monopulse processor 44 comprises two interconnected subsystems, namely, an angular error generator 44a and an angle-locked loop (ALL) 44b. The angle-locked loop (ALL) plays a role similar to the delay-locked loop (DLL) or phase-locked loop (PLL) popularly used in GPS receivers that we discussed in FIG. 5. A loop filter 244 is used to average out angular jitters and noise, while anticipating the angular motion caused by either the GPS satellite or the array antenna or both. The feedback built into the angle-locked loop can also reduce nonlinearity in monopulse angular measurement. The loop filter 244 provides an angular offset (or angular rate if scaled by the sample period) that is added onto the previous angular estimate stored at the delay unit 248 to produce the current angular estimate 250 of the incident wavefront relative to the array antenna. This angular estimate, which may be combined with an external aiding 70 if available, is supplied to the angular error generator to aim the array antenna boresight electronically. During the initial angular acquisition mode, a sky search 246 can be affected. The monopulse steering vector 252 can also be connected to the integrated attitude estimator 46b when the three-axis attitude estimate becomes available.

Figure 7B:
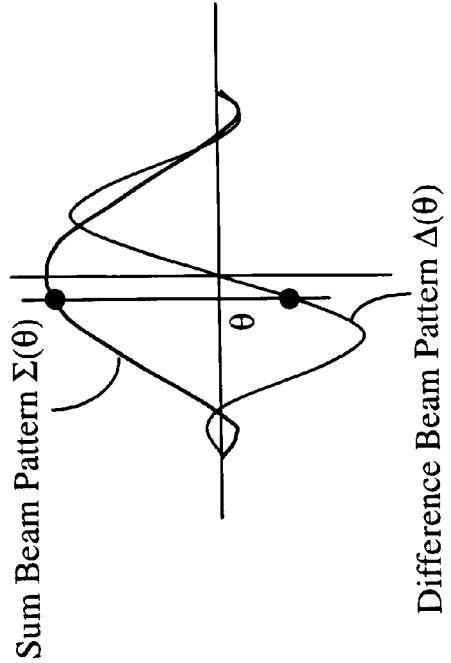
FIG. 7a, FIG. 7b, and FIG. 7c are graphic representations of the exemplary monopulse angular measurement process in accordance with the present invention.
Figure 7A:
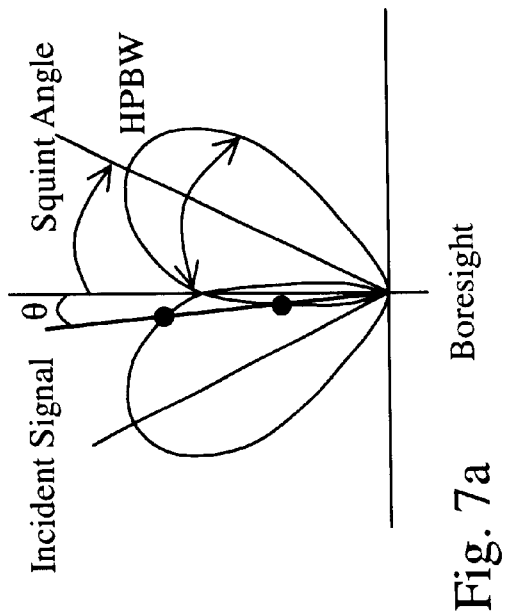

For each angular direction (elevation or azimuth), two squint beams are formed as graphically shown in FIG. 7a. The squint angle from the boresight is usually made to be half of the half-power beamwidth (HPBW). Due to their angular displacement, the two shaped beams exhibit different responses to an incident signal at θ. To measure this angle θ, the responses from the two squint beams are added together to form the sum beam Σ and subtracted one from the other to form the difference beam Δ, as graphically illustrated in FIG. 7b. The sum and difference beams can be synthesized from the array antenna measurement vector X, respectively, as $$\Sigma = W_\Sigma^H X \quad (2a)$$

$$\Delta = W_\Delta^H X \quad (2b)$$

where $W_\Sigma$ is the real and even sum weighting vector, $W_\Delta$ is the imaginary and odd difference weighting vector, and the superscript H stands for a complex conjugate transpose (Hermitian). In the case without jamming, Taylor and Bayliss weightings are typically used as the quiescent patterns for sum and difference beams, respectively, to have a narrow mainlobe and low sidelobes. See Y. T. Lo and S. W. Lee, *Antenna Handbook: Theory, Applications, and Design*, Van Nostrand Reinhold Company, 1988, the disclosure of which are incorporated into this specification by reference. The mainlobe is pointed at a desired direction as the electronic boresight.

As shown in FIG. 7b, the sum beam has a symmetrical amplitude profile with its maximum at the boresight, while the difference beam has antisymmetrical amplitude profile with zero response at the boresight. For the given incident signal at θ, the sum and difference beam responses are $\Sigma(\theta)$ and $\Delta(\theta)$, respectively, as shown in FIG. 7b. The angle of arrival θ can be accurately determined by evaluating the monopulse ratio $\Delta(\theta)/\Sigma(\theta)$. For a noise-free case with uniform weighting, the monopulse ratio by phase comparison is given by $$\frac{\Delta(\theta)}{\Sigma(\theta)} = j\tan\left(\frac{\pi N d}{2\lambda}\sin\theta\right) \approx j\frac{\pi N d}{2\lambda}\theta \quad (3)$$

Figure 7C:
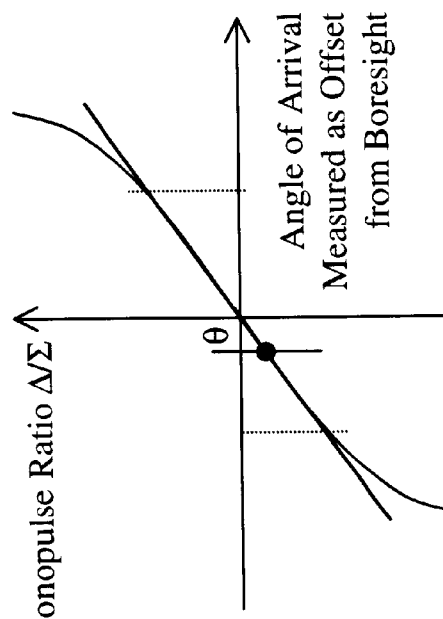

1
where d is the array element spacing, N is the number of antenna elements, and λ is the wavelength. The approximation in Eq. (3) holds for small θ and indeed over a certain linearity interval around the boresight as shown in FIG. 7c. For noise case, a maximum likelihood formulation also leads to the monopulse with sum and difference beams. See R. C. Davis, L. E. Brennan, and I. S. Reed, "Angle Estimation with Adaptive Arrays in External Noise Field," *IEEE Trans. on Aerospace and Electronic Systems*, Vol. 12, No.2, March 1976, the disclosure of which are incorporated into this specification by reference.

Referring back to FIG. 6, the difference beamforming 232 provides the difference beams in the elevation $\Delta_E$ and azimuth $\Delta_A$ to the monopulse ratio 236. At the same time, the sum beamforming 234 provides to the monopulse ratio 236 the sum beams in the elevation $\Sigma_E$ and azimuth $\Sigma_A$. The corresponding beamforming weightings $W_{\Delta E}$, $W_{\Delta A}$, $W_{\Sigma E}$, and $W_{\Sigma A}$ are generated in the constrained adaptive weights calculation process 238. To perform this calculation, the quiescent pattern around the desired boresight is provided by the angle-locked loop 44b through connection 252. Different from the blind adaptive nulling processor 20, the simultaneous interference nulling 240 on the sum and difference beams is required in both the elevation and azimuth directions. The information about the interference is passed over from the blind adaptive nulling processor 20 via the connection 28. Further, the interference nulling will alter, if not constrained properly, the quiescent antenna pattern by inserting nulls. To keep the adapted antenna pattern from distorting the monopulse ratio, the monopulse ratio slope constraints 242 have to be imposed onto the weight calculation 238 to ensure accurate angular measurements.

Several authors have set forth techniques for simultaneous nulling in sum and difference beams and for monopulse ratio slope preservation. See, R. L. Haupt, "Simultaneous Nulling in Sum and Difference Patterns of a Monopulse Antenna", *IEEE Trans. on Antennas and Propagation*, Vol. 32, No. 5, February 1984; T. B. Vu, "Simultaneous Nulling in Sum and Difference Patterns by Amplitude Control", *IEEE Trans. on Antennas and Propagation*, Vol. 34, No. 2, February 1986; and R. L. Fante, "Synthesis of Adaptive Monopulse Patterns", *IEEE Trans. on Antennas and Propagation*, Vol. 47, No. 5, May 1999, the disclosures of which are incorporated into this specification by reference. Some of the prior-art techniques, though originally developed for radar applications, can be modified for use in the present invention. The technique of R. L. Fante is of particular interest in which the sum beam weighting $W_\Sigma$ is formed similar to Eq. (1).

However, the difference beam of this technique explicitly incorporates the monopulse slope constraints. Write the vector of array responses to a point source at angle θ as $g(\theta) = [g_1, \ldots, g_N]^T$ with $g_n = \exp(j2\Pi d_n \sin\theta/\lambda)$, where $d_n$ is the location of the n-th antenna in the array. The monopulse slope constraints are formulated as $$\frac{W_\Delta^H g(\theta_0 \pm \Delta\theta_k)}{W_\Sigma^H g(\theta_0 \pm \Delta\theta_k)} = \pm k_s \Delta\theta_k, k = 1, 2, \circledast \quad (4)$$

where $\theta_0$ is the desired boresight, $\Delta\theta_k$ is the k-th angular offset from the boresight, up to which the slope constant $k_s$ is to be preserved. Together with the nominal constraint that the difference beam produces a zero at boresight $W_\Delta^H g(\theta_0) = 0$, the equation for an example with k=2 slope constraints becomes $$W_\Delta^H H = \rho \quad (5)$$

where
$H = [g(\theta_0 + \Delta\theta_k), g(\theta_0), g(\theta_0 - \Delta\theta_k)]$,
$\rho^T = k_s[W_\Sigma^H g(\theta_0 + \Delta\theta_k), 0, -W_\Sigma^H g(\theta_0 - \Delta\theta_k)]$
By minimizing the average jammer power subject to the above constraint, the difference beam weighting can be found as $$W_\Delta = R^{-1} H^* (H^H R^{-1} H^*)^{-1} \rho \quad (6)$$

For planar arrays or for those that admit antenna pattern factorization into azimuth and elevation factors, the techniques outlined by Yu and Murrow (see K. B. Yu and D. J. Murrow, Adaptive Digital Beamforming Architecture and Algorithm for Nulling Mainlobe and Multiple Sidelobe Radar Jammers While Preserving Monopulse Ratio Angle Estimation Accuracy, U.S. Pat. No. 5,600,326, Issued Feb. 4, 1997 and K. B. Yu and D. J. Murrow, Simultaneous Multibeam Approach for Canceling Multiple Mainlobe Jammers While Preserving Angle Estimation Accuracy on Mainlobe Targets, U.S. Pat. No. 5,371,506, Issued Dec. 6, 1994) can be adapted for use with the present invention.

To cancel mainlobe and sidelobe jammers effectively, the technique of Yu and Murrow needs to know the angular location of the signal of interest with accuracy. It is under this condition that difference beams of high gain can be used to cancel the mainlobe jammer without introducing excess noise in the main antenna. It is also under this condition that the sidelobe cancellation can take place without affecting the mainlobe signal by first blocking it in the mainlobe direction with matrix projection. Such a condition is reasonable for such applications as maintaining a directional communication link under jamming. However, for angular measurement applications, the signal direction is what to be found in the first place. The present invention can therefore be used to satisfy the condition before the mainlobe and sidelobe jammer cancellations take place.

Other techniques that do not impose monopulse ratio slope constraint in the adaptation process but rather afterfact apply corrections for the slope and bias caused by the adaptation may also be modified for use with the present invention. See U. Nickel, "Monopulse Estimation with Adaptive Arrays," *IEE Proceedings-F*, Vol. 140, No. 5, October 1993, the disclosure of which is incorporated into this specification by reference.

Figure 8:
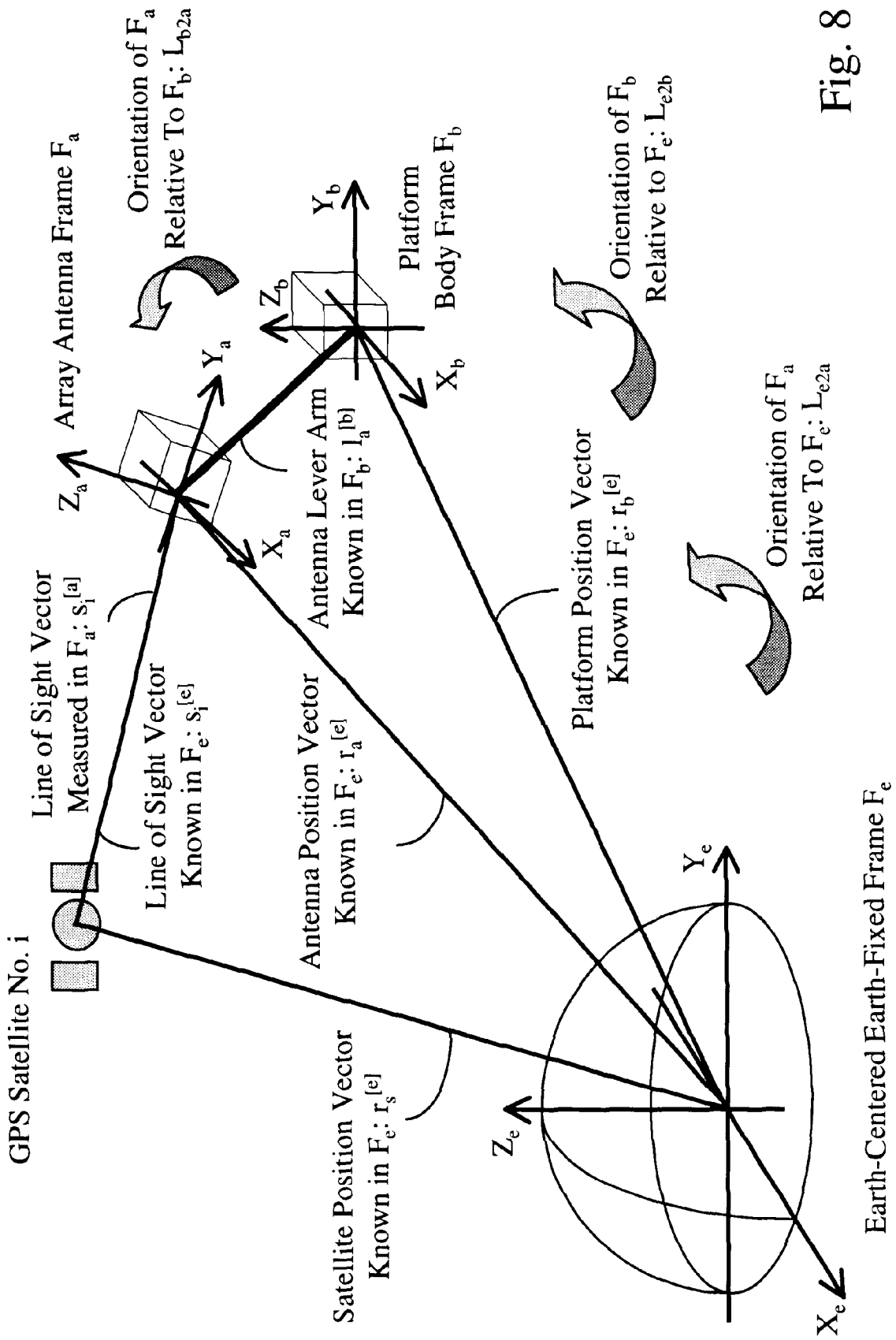
FIG. 8 is a graphic representation of definitions of various reference frames and associated position vectors and relative attitude orientation matrices in accordance with the present invention.

Referring to FIG. 8, various coordinate systems or reference frames are defined for three-axis attitude determination in accordance with the present invention. Since GPS satellite position data are given in the earth centered and earth fixed (ECEF) coordinate system, denoted by $F_e$, it can be used as the reference frame with respect to which the antenna-carrying platform body frame, denoted $F_b$, is defined. Of course, other reference frames such as a local level north-pointing coordinate system centered at the platform location can also be used instead.

A coordinate system is attached to the array antenna, denoted by $F_a$. When this array antenna, be it a one dimensional linear or two dimensional planar or any other geometry array, is installed into a carrier platform, its orientation with respect to the platform body frame is assumed to be known with great accuracy. Their relative attitude is represented by a rotation matrix from the body frame to the antenna frame, denoted by $L_{b2a}$.

The attitude of the platform body relative to the ECEF frame is given by $L_{e2b} = L_{b2a}^T L_{e2a}$, where $L_{e2a}$ is the rotation matrix from the ECFE frame to the antenna frame. Since $L_{b2a}$ is already known, the attitude determination becomes finding $L_{e2a}$ from angular measurements.

Given the GPS satellite ephemeris demodulated from navigation data and the receiver location from position fixing, the line of sight (LOS) vectors from the array antenna to the satellites of interest, denoted by $s_i^{[e]}$, can be calculated. The subscript i designates the satellite number and the superscript [e] indicates the frame in which the vector is expressed.

This LOS vector is also the direction in which the incident signal wavefront is perceived by the array antenna. Relative to the antenna frame, the "elevation" and "azimuth" angles of this signal direction of arrival can be measured. This direction can also be written into a unit vector of three direction cosines, denoted by $s_i^{[a]}$, where the superscript [a] indicates that the vector is expressed in the antenna frame. However, the angular measurements are corrupted by noise, denoted by $n_i$. The equation relating the angular measurements to the attitude is given by $$s_i^{[a]} = L_{e2a} s_i^{[e]} + n_i \text{ for } i=1, 2, \ldots, M \tag{7}$$

where M is the total number of satellites in view.

Due to the presence of measurement errors and the fact that the system of measurement equations is over-determined, the use of a weighted least-squares fitting technique seems appropriate for a snapshot solution. The cost function can be written as:

$$J(L_{e2a}) = \sum_{i=1}^{M} w_i |s_i^{[a]} - L_{e2a} s_i^{[e]}|^2 2 \tag{8}$$

where $w_i$ is a weighting coefficient accounting for confidence on individual measurements.

The rotation matrix can be parameterized as a full matrix with 9 parameters, as the direction cosine matrix with 6 parameters, as an Euler angle set with 3 parameters (roll, pitch, and yaw), and as the quaternion vector with 4 parameters. For numerical superiority, the cost function can be cast in terms of the quaternion vector for optimization and the resulting attitude solution can then be converted into the Euler angles for easy presentation.

An attitude calculation algorithm can be used to obtain the optimal solution to the above cost function. Several well-defined algorithms (see M. D. Shuster and S. D. Oh, "Three-Axis Attitude Determination from Vector Observations", *J. of Guidance and Control*, 4(1), 1981; F. L. Markley, "Attitude Determination Using Vector Observations: A Fast Optimal Matrix Algorithm", *J. of the Astronautical Science*, 41(2), 1993), widely used in satellite attitude determination with sun and earth sensors, can be adapted for use in the present invention.

Figure 9:
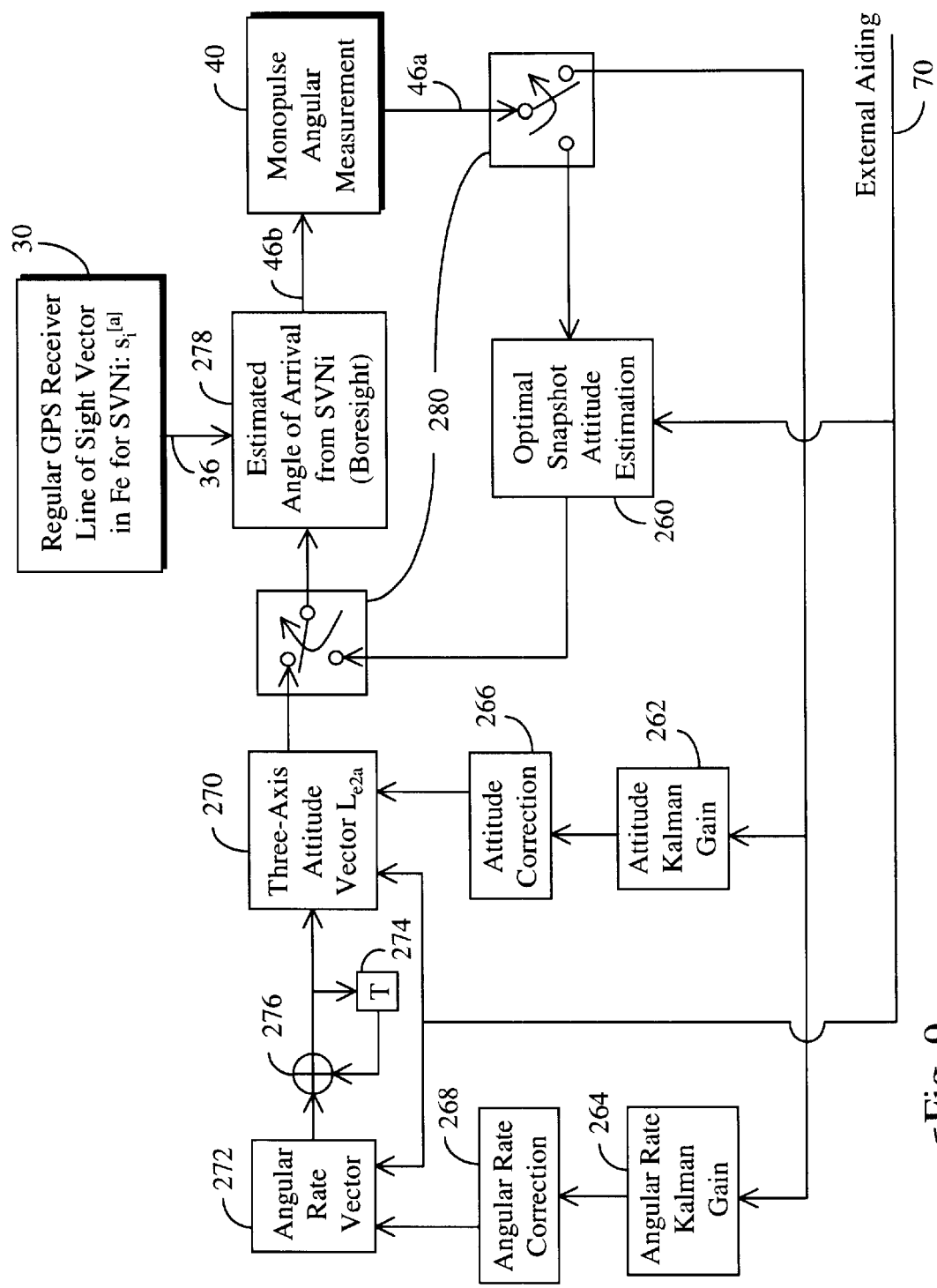
FIG. 9 is a schematic of an exemplary embodiment of a three-axis attitude determination process in accordance with the present invention.

Referring to FIG. 9, an exemplary embodiment of an integrated attitude determination schematic is shown in accordance with the present invention. The integrated attitude estimation is implemented in the form of a Kalman filter, with which the uncertainties in the angular dynamics and angular measurements can be modeled and thus taken into account in the filtering process. The three-axis attitude vector 270 and the angular rate vector 272 constitute the Kalman filter state vector. The measured angular offsets 46a of all visible GPS signals are obtained by the monopulse angular measurement 40. They are multiplied by the Kalman filter attitude gain 262 and angular rate gain 264, respectively, to yield the attitude correction 266 and angular rate correction 268. The angular rate estimate 272 is integrated in time by a discrete integrator made of a delay 274 and an adder 276. The line of sight from the array antenna to a GPS satellite is first expressed in the ECEF frame $s_i^{[e]}$ 36, provided by the regular GPS receiver 30. This line of sight vector is then rotated by the estimated three-axis attitude $L_{e2a}$ 270 to the array antenna frame $s_i^{[a]}$ 46b. It serves as the electronic boresight to center the sum and difference beams for angular offset measurement. By a switch 280, the angular offset measurements 46a can also be routed to the optimal snapshot attitude estimator 260 as an alternative to the Kalman filter or to initialize the Kalman filter at start. Any external aiding information 70, if available, can be incorporated into either the snapshot estimator or Kalman filter.

As previously analyzed, the attitude determination function cannot be placed in series with the anti-jamming function and it has to operate in parallel on the unaltered antenna outputs. This suggests a cascaded parallel topology as exemplified in FIG. 1. Corresponding to this topology, an ordered sequence of operations is implied to ensure the proper coordination.

A blind adaptive nulling processor 20 is inserted ahead of a regular GPS receiver 30. The blind adaptive nulling processor starts with no a prior information about jammers nor about GPS signals and ends up with synthesizing new antenna patterns with nulls directed toward jammers. By spatially filtering the array antenna outputs, it suppresses the jamming components and produces a jam-free or less corrupted signal to the GPS receiver. By virtue of spatial filtering, it also obtains the information about individual jammers in the forms of measurement covariance matrix, eigenstructure, weighting vectors or angular locations. This information is also important for attitude determination 50 under jamming using the constrained beamforming adaptive monopulse technique 40.

Once the jammers are suppressed and the GPS receiver is able to acquire and track GPS satellites, the attitude determination algorithm can be turned on at this point of time. The number of GPS satellites visible and their respective code chip, Doppler frequency, and navigation data bit are passed over from the receiver to the angular measurement preprocessing unit 42, in which a baseband carrier is produced for each antenna element and for each satellite of interest. At this point, jammers are still present in individual antenna signals.

These modulation-stripped carrier signals from the array antenna elements are then used to determine the angles of arrival of GPS signals. Without jammers, many direction-finding algorithms can be applied. However, the presence of jammers restricts the choice. The use of constrained beamforming adaptive monopulse technique is preferred to achieve angular tracking measurement. Digital beamforming has the ability to form the desired beam patterns while satisfying spatial constraints. This is the basis for its anti-jam capability. The nulls toward jammers are placed simultaneously in the sum and difference beams that are formed for each satellite. In the spirit of the present invention, other techniques may be applied here as a replacement to accomplish essentially the same task.

The basic idea behind determination of the relative attitude between two reference frames is to relate the measurements of a common vector quantity in the two frames. In the GPS case, the common vector quantity is the LOS vector from the array antenna to the satellite of interest. This LOS vector is first measured in the ECEF frame by the regular GPS receiver. Its measurement in the antenna frame is just the angles of arrival relative to the antenna boresight, as given by the angular measurement unit. A least-squares optimization process can then be used to find the attitude matrix in a snapshot manner or a Kalman filter can be used to perform a continuous estimation in an integrated manner.

The attitude capable GPS receiver of the present invention has an additional utility in that it can be used for locating detected interference sources. Knowing the ownship attitude and also knowing the interference direction of arrival relative to the ownship, the angular measurements of the jammers in a common reference frame can thus be constructed. With a number of such angular measurements taken at different ownship positions, the location of the jammer can be determined by triangulation.

Another feature of the present invention is that it allows for use of external information about the ownship attitude and position as an aiding to monopulse angular measurement, attitude determination, as well as positioning. This facilitates its integration with or retrofitting to other existing devices.

Although the description above contains much specificity, these should not be construed as limiting the scope of the invention but as merely providing illustrations of some of the presently preferred embodiments of this invention. For example, the present invention provides a generic signal processing architecture of versatility where many processing blocks can be tailored to achieve a desired combination of functionalities. A time-domain beamforming has been used to describe the blind adaptive nulling and the constrained adaptive monopulse. However, a frequency-domain implementation of both is mathematically equivalent and can thus be used as a functional replacement. Further, the regular GPS receiver can also be implemented in the frequency domain as outlined in the related patent application Ser. No. 09/550,064, filed Apr. 14, 2000, entitled Method and Device for Rapidly Extracting Time and Frequency Parameters from High Dynamic Direct Sequence Spread Spectrum Radio Signals Under Interference. The monopulse beamforming can be performed after the despreading correlation as described in the present exemplary embodiment or prior to the despreading correlation as an alternative embodiment. The present invention method and system have been presented in terms of digital signal processing as software implementation. It can nevertheless be implemented in hardware using phase shifters and/or attenuators.

The present invention can also be applied to cases where interference is not of concern, resulting in a great deal of simplifications. In addition to eliminating all the processing related to adaptive nulling and constrained beamforming that become unnecessary, the regular GPS positioning and timing functions can be directly hooked to the reference element of the array antenna. The monopulse beamforming and angular measurement can be performed after code despreading integration or prior to code despreading integration.

The Sample Matrix Inversion (SMI) technique has been described in the present invention as the preferred method for adaptive weight calculation. However, many other techniques can be employed to obtain optimal or constrained adaptive weights for the same purpose. This may include recursive least-squares algorithms, as well as other projection and optimization algorithms.

Similarly, the monopulse technique has been described in the present invention as the preferred method to measure the directions of arrival of GPS signals. However, other super-resolution, spectral analysis, and eigen decomposition techniques can be equally applied to perform the angular measurement function within the frame of the present invention.

It is understood that the various figures described above illustrated only the preferred embodiments of the present invention system and method. A person skilled in the art can therefore make numerous alterations and modifications to the described embodiments utilizing functionally equivalent components and method steps to those shown and described. All such modifications are intended to be included within the scope of the present invention as defined by the appended claims.

What is claimed is:

1. A system for determining attitude relative a predefined coordinate frame using signals received from global positioning system satellites, said system comprising:

an array antenna containing a plurality of antenna elements, wherein each of said antenna elements receives signals from the global positioning system satellites;

a GPS receiver coupled to said array antenna for determining the longitude, latitude and altitude of said array antenna from the received signals;

an angular measurement circuit coupled to said array antenna and said GPS receiver for determining the angles of arrival of the signals received by the array antenna; and an attitude determination containing a Kalman filter that receives the angular offsets from said angular measurement circuit and calculates the attitude of the array antenna, relative the predefined coordinate frame, from the angles of the signals received.

2. The system according to claim 1, further including a nulling processor disposed between said array antenna and said GPS receiver for suppressing received signals other than said signals from the global positioning system satellites.

3. The system according to claim 1, further including a radio frequency front end circuit disposed between said array antenna and said GPS receiver for converting said signals into corresponding digital signals.

4. The system according to claim 2, wherein said nulling processor includes filters that implement beamforming and place nulls toward interference sources detected by said array antenna.

5. The system according to claim 4, wherein said filters in said nulling processor further include a multiplexer for weighting signals received by said array antenna.

6. The system according to claim 1, wherein the angular measurement circuit is a beamforming adaptive monopulse processor that contains a pre-processor, an angular error generator and an angle locked loop and calculates measured angular offsets for the received signals.

7. The system according to claim 6, wherein said pre-processor is coupled to said GPS receiver, wherein said pre-processor removes Doppler frequency shift, spreading code chip and navigation data bit from said signals, prior to said signals being received by said angular error generator.

8. A method of determining the attitude of an antenna array relative a predetermined coordinate frame using signals from global positioning system satellites, said method comprising the steps of:

provinding an array antenna that contains a plurality of antenna elements;

detecting the signals from the global positioning system satellites with the array antenna;

converting the signals received by the array antenna into corresponding digital signals;

calculating the angles of arrival of the signals received by the array antenna; and calculating an attitude for the array antenna from the angles of arrival of the signals.

9. The method according to claim 8, further including the step of suppressing signals received by the array antenna other than the signals from the global positioning system satellites.

10. The method according to claim 8, further including the step of reducing the signals from a first carrier frequency to a lower intermediate frequency.

11. The method according to claim 8, wherein said step of detecting the signals includes coupling a GPS receiver to the array antenna, wherein said GPS receiver determines longitude, latitude and altitude of the array antenna from the signals.

12. The method according to claim 8, further including the step of providing an adaptive nulling processor between the GPS receiver and the array antenna for suppressing signals received by said array antenna other than the signals from the global positioning system satellites.

13. The method according to claim 8, further including the steps of detecting interference signals with said antenna array and calculating a point of origin for said interference signals.

14. The method according to claim 8, wherein said step of calculating the angles of arrival of the signals includes preprocessing digital signals to remove modulation and producing an angular measurement corresponding to each of said signals.

15. The method according to claim 8, wherein said step of calculating an attitude for the array antenna includes the substeps of:

determining the location of the array antenna from the GPS receiver;

reading the location of the global positioning system satellites from the GPS signals;

calculating line of sight vectors between said array antenna and the global positioning system satellites utilizing the location of the array antenna and location of the global positioning system satellites;

calculating a three axis vectors corresponding to the GPS signals; and calculating attitude utilizing the three axis vectors converted from angles of arrival of GPS signals and line of sight vectors between said array antenna and the global positioning system satellites.

16. A method of determining the attitude of an antenna array relative a predetermined coordinate frame using signals from global positioning system satellites, said method comprising the steps of:

providing an array antenna that contains a plurality of antenna elements;

detecting the signals from the global positioning system satellites with the array antenna;

suppressing signals received by the array antenna other than the signals from the global positioning system satellites calculating the angles of arrival of the signals received by the array antenna; and calculating an attitude for the array antenna from the angles of arrival of the signals.

* * * * *